May 17, 1932.  A. B. WEBB  1,858,567
GROUTER FOR WHEELS
Filed July 24, 1930  2 Sheets-Sheet 1

Inventor:
Arthur B. Webb,
Wm. F. Freudenreich,
Atty.

May 17, 1932.  A. B. WEBB  1,858,567
GROUTER FOR WHEELS
Filed July 24, 1930   2 Sheets-Sheet 2
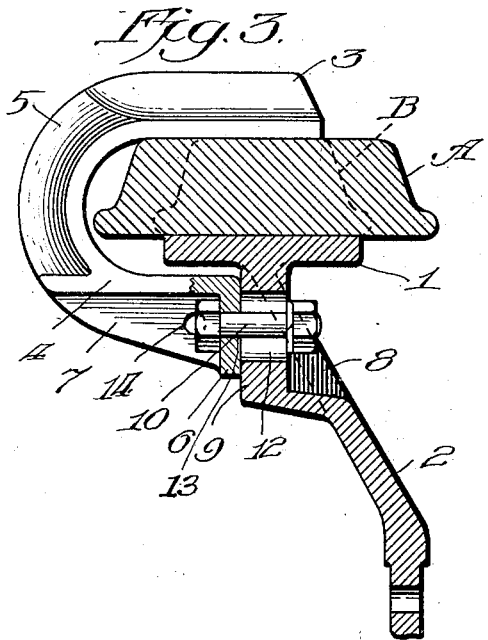
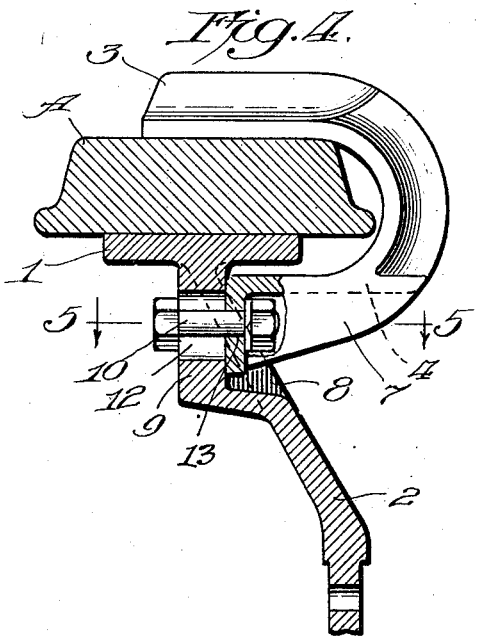
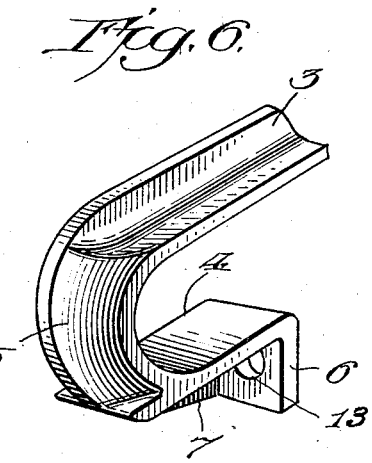
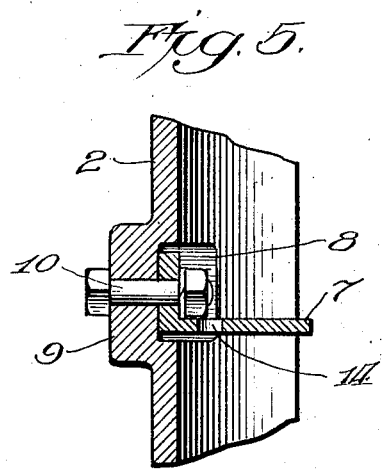
Inventor;
Arthur B. Webb,
by Wm F Freudenreich,
Atty Patented May 17, 1932

1,858,567

UNITED STATES PATENT OFFICE

ARTHUR B. WEBB, OF MILWAUKEE, WISCONSIN, ASSIGNOR TO THE RIGHTWAY CORPORATION, A CORPORATION OF INDIANA

GROUTER FOR WHEELS

Application filed July 24, 1930. Serial No. 470,376.

Trucks, tractors and the like often must operate under conditions that make it impossible for the wheels to have good traction and it is therefore desirable that means be available to provide the wheels with projections or cleats when needed. The object of the present invention is to produce a simple and novel means for this purpose.

Heretofore cleat-like devices or grouters have been used to some extent on wheels of special design, particularly double-tread or tire wheels, so that their field of usefulness has been very limited. Viewed in one of its aspects the present invention may be said to have for its object to produce a simple and novel grouter that may be applied to any wheel without further modification than to provide points of attachment about the wheel center.

Further objects of the present invention are to produce a simple and novel grouting device that will be effective in connection with tires of various widths and thicknesses, be adjustable to compensate for wear in the tires, and be easily shifted from a working position to an idle position on the same wheel.

Figure 1:
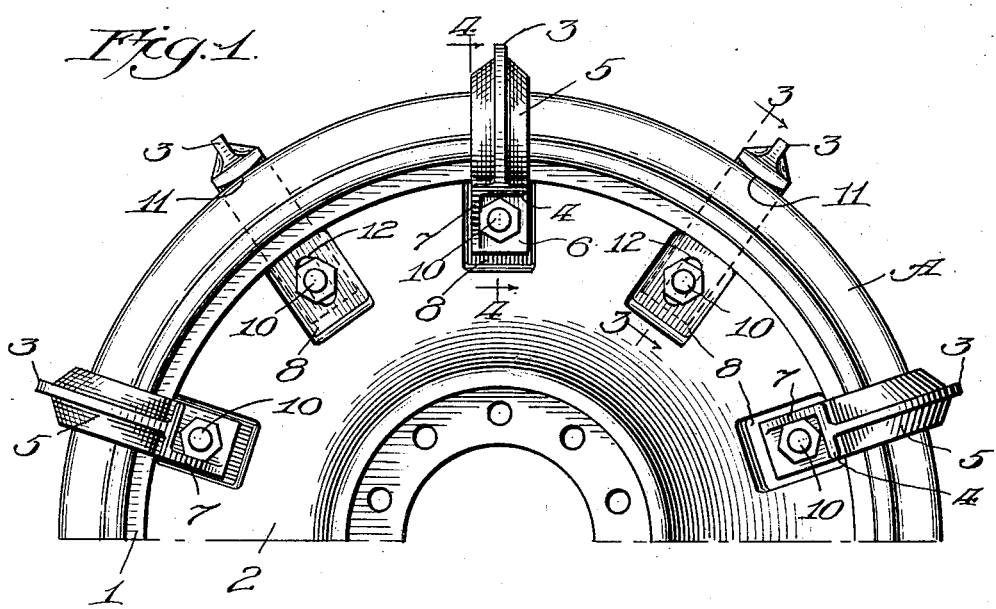
Figure 2:
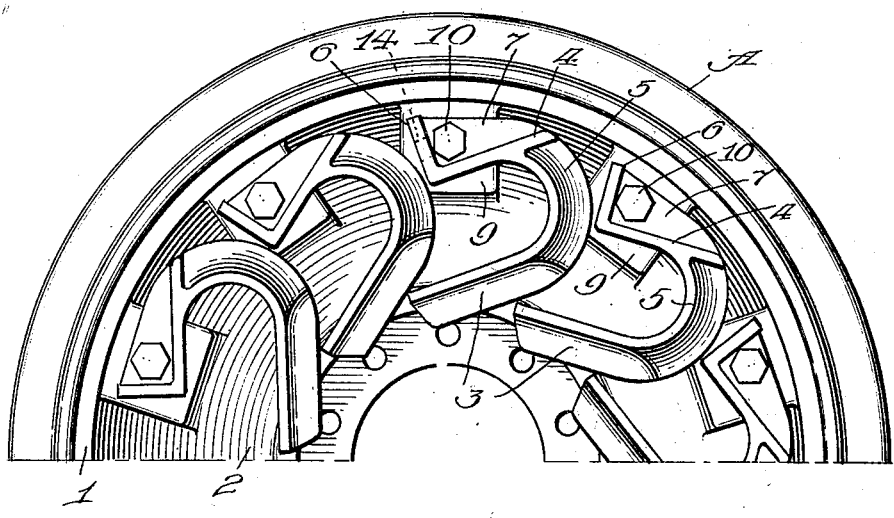

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side view of half of a wheel having my improved grouters arranged thereon in working positions; Fig. 2 is a view of the opposite side of the wheel, showing the grouters in idle positions; Figs. 3 and 4 are sections through the wheel on lines 3—3 and 4—4, respectively, of Fig. 1; Fig. 5 is a section on line 5—5 of Fig. 4; and Fig. 6 is a perspective view of one of the grouters removed from the wheel.

Referring to the drawings, 1 and 2 are the rim and the web of a disc wheel respectively. Surrounding the rim is a tire which may be wide as shown in full lines at A or narrow as indicated by the dotted line contour B in Fig. 3. The grouters are in the form of U-shaped members each having a long arm 3, T-shaped in cross-section, and a shorter arm 4. The connecting piece 5 between the two arms is preferably heavy and rugged.

Means are provided for securing the free end of the shorter arm of the device to the web of the wheel, inwardly of the rim, so that the longer working arm extends transversely across the top or tread of the tire. The parts are so proportioned that the part 5 of the device stands far enough away from the edge of the rim to clear the edge of a wide tire. About the simplest way of fastening the grouters to the wheel is by means of bolts. In the arrangement shown, the arm 4 is thin and flat and terminates in a flange 6 at right angles thereto. The arm and flange are connected by a web 7 lying on one side of the arm and providing it with a broad flat bearing face at right angles to the flange whose outer side forms a second bearing face. The wheel web is provided with a circle of distributed bearing seats located near the rim and lying in a plane at right angles to the axis of the wheel.

In the arrangement shown, these bearing faces are formed by shaping the web of the wheel into a series of pockets 8, whose bottom walls 9 are at right angles to the axis of the wheel. It may be desirable at times to have all of the grouters on one side or the other of the wheel and at other times to have some on one side and some on the other. Consequently it is desirable to have bearing seats for the grouters on both sides of the wheel. Such double bearing seats are provided by the bottom walls of the pockets in the web of the wheel, as the flange on a grouter may be set against such bottom wall either in the manner shown in Fig. 3 or that shown in Fig. 4. To secure the grouter in place, a bolt 10 is inserted through a hole 13 in the flange on the grouter and the wall 9 with which it engages.

With such an arrangement as I have just described, the working arm of the grouter need not be long enough to extend entirely across the tire because the arms of half the grouters on a wheel may project over from one edge of the tire and those of the other half from the opposite edge.

The working arms of the grouters should rest on the tires when in working position and therefore, in order that they shall not cut the tires, the inner or under face of each working arm is rounded as indicated at 11. Furthermore, the grouters should be permitted to rest on the tires regardless of the initial thickness of the latter or the extent of allowable wear thereof without making the application of the grouters difficult. Therefore the bolt-receiving holes in the web of the wheel are made in the form of radial slots 12 so disposed that the bolts may be applied while the grouters stand outwardly from the tire. Then the grouters are moved against the tire and the bolts are tightened. As wear takes place in the tire, the bolts are simply moved nearer the axis of the wheel, thus enabling the grouters to follow the tire inwardly.

It will be seen that the long axes of the bolts or studs that hold the grouters in their working positions are parallel with the axis of rotation of the wheel. Consequently, in the event that one of the grouters strikes an obstruction, causing the grouter to be drawn outwardly more or less, the grouter may at the same time swing about the axis of its bolt device and thus remain in contact with the tire. Therefore the grouters will operate efficiently even though some of them may have been shifted more or less out of their normal working positions. The pin and slot connections, whether arranged in the manner shown, or in some other equivalent manner, therefore serve securely to hold the grouters in any desired position of adjustment under normal conditions while permitting a swinging movement under abnormal conditions; the adjustment permitting the grouters initially to be brought into contact with the tread surfaces and thereafter to remain in contact with such surfaces in the event of a bodily displacement of the grouters.

It is desirable to store the grouters, when not in use, in a place that makes them readily accessible when wanted and avoids the danger of mislaying and losing them. I have therefore made provision for fastening them to the side of the wheel at times when their assistance in securing traction is not required. In order to store them they are simply laid against the side of the wheel with their web portions 7 resting against the outer faces of the bottom walls of the pockets in the wheel, the bolts being slipped through bolt holes 14 in the webs and through the slots 12. When thus stored, the grouters are housed under the rim of the wheel and are entirely out of the way. Fig. 2 shows how the wheel appears when the grouters are stored thereon, and Fig. 1 when the grouters are in working positions, half supported from one side of the wheel and the remainder from the other side.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a dished disc wheel, having a series of pockets formed therein to produce a circular series of seats at right angles to the axis of the wheel on each side of the disc, U-shaped grouters, and means to secure the grouters either to any of said seats with parts thereof extending across the wheel tread or to some of the seats while the grouters lie beside the wheel inwardly from the tread.

2. A grouter comprising a U-shaped member one of whose arms has two bearing faces in planes at right angles to each other, one at the end and the other at one side adjacent to said end, and there being a bolt hole through each of said bearing faces.

3. A grouter comprising a U-shaped member, a flange at the free end of one arm and transverse to the plane of said member, and a web connecting the flange and the said arm, the web and the flange each having a bolt hole to receive bolts to hold said arm to a wheel with the other arm lying either across the wheel tread or beside the wheel.

4. In combination, a wheel having on one side thereof a circular series of seats arranged in a plane at right angles to the axis of the wheel, a rigid, U-shaped grouter, one arm of which is adapted to extend across the tread of the wheel and the other arm of which is adapted to lie at right angles to one of said seats, the latter arm of the grouter having at the end a broad base to rest against the seat on the wheel and having on one side in the plane of the U a flat bearing face, each seat on the wheel having a bolt hole therethrough, the grouter having bolt holes extending through said base and through said face on the side at right angles to each other, and a bolt adapted to extend through one of the bolt holes in the wheel and through either of the holes in the grouter in order to hold the grouter rigid with one arm projecting across the wheel tread or with both arms lying beside the wheel.

In testimony whereof, I sign this specification.

ARTHUR B. WEBB.